United States Patent [19]
Murfet et al.

[11] Patent Number: 5,155,486
[45] Date of Patent: Oct. 13, 1992

[54] ASYNCHRONOUS SERIAL DATA RECEIVER WITH CAPABILITY FOR SAMPLING THE MID-POINT OF DATA BITS

[75] Inventors: Philip J. Murfet, Braishfield; Christopher N. Wallis, Winchester, both of England

[73] Assignee: International Business Machines Corporation, Armonk, N.Y.

[21] Appl. No.: 501,448

[22] Filed: Mar. 28, 1990

[30] Foreign Application Priority Data

Mar. 29, 1989 [GB] United Kingdom ............... 89303069

[51] Int. Cl.⁵ .............................................. H03M 9/00
[52] U.S. Cl. ...................................... 341/100; 375/106
[58] Field of Search ............................. 341/100, 101; 364/239.2, 939.5; 375/106

[56] References Cited

U.S. PATENT DOCUMENTS

| | | | |
|---|---|---|---|
| 3,801,956 | 4/1974 | Braun et al. | 375/116 X |
| 3,946,379 | 3/1976 | Lippman | 340/347 |
| 3,953,837 | 4/1976 | Cheek, Jr. | 365/238 |
| 4,015,252 | 3/1977 | Symanski | 341/100 |
| 4,165,539 | 8/1979 | Aichelmann, Jr. | 365/183 |
| 4,447,804 | 5/1984 | Allen | 341/100 |
| 4,605,921 | 8/1986 | Ridde et al. | 341/65 X |
| 4,717,914 | 1/1988 | Scott | 340/825.06 |
| 4,821,297 | 4/1989 | Bergmann et al. | 375/106 X |

FOREIGN PATENT DOCUMENTS 3126894 1/1983 Fed. Rep. of Germany.

OTHER PUBLICATIONS

Japanese Patent Abstract, vol. 8, No. 107, May 29, 1984.
Japanese Patent Abstract, vol. 7, No. 204, Sep. 9, 1983.

*Primary Examiner*—Howard L. Williams
*Attorney, Agent, or Firm*—Greenlee & Winner

[57] ABSTRACT

An asynchronous serial data receiver utilizes plural samples of each data bit in a word to assure detection and reading of the midpoint of each bit to mitigate problems associated with noise and mismatches between the data and sampling rates. To this end, a shift register having plural stages for each bit samples the data stream at a clock rate which is a multiple of the data rate which provides multiple samples of each incoming bit. When the data word is fully read into the shift register the start bit is detected and initiates a parallel transfer of the data word using bit values taken from the midpoint of each bit period.

5 Claims, 2 Drawing Sheets

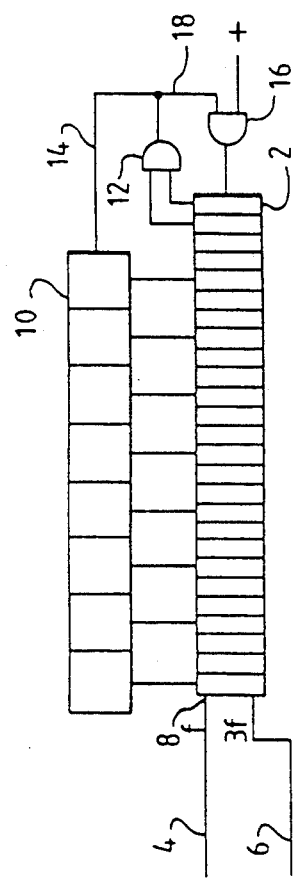
FIG. 1
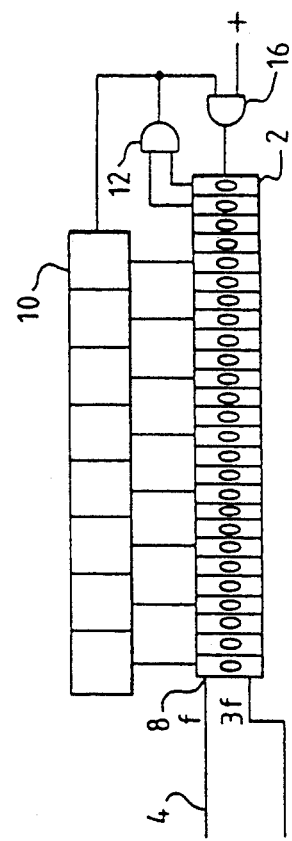
FIG. 2a
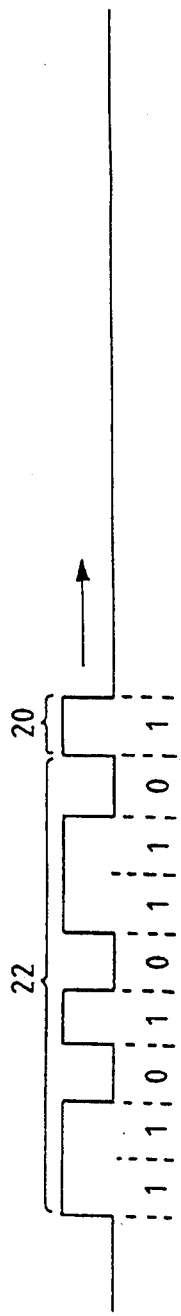

ASYNCHRONOUS SERIAL DATA RECEIVER WITH CAPABILITY FOR SAMPLING THE MID-POINT OF DATA BITS

This invention relates to the field of serial data receivers. More particularly, this invention relates to serial data receivers for receiving asynchronous serial data, i.e., serial data for which the phase is unknown.

Typical of known asynchronous serial data receivers is that shown in GB1507761. The approach taken is to rapidly sample the input data line to identify the leading edge of the first bit of the input data word. This sampling is carried at a rate many times in excess of the input data rate, e.g., 16 or 64 samples per data bit period depending on the precision required. The first bit of the input data word is a start bit. The start bit is provided for the purpose of establishing synchronization and does not carry any information. The detection of the leading edge of the start bit is used to synchronize the clock of the receiver with the input data. The synchronized clock is then used to control the receiver to sample the input data line once per data bit period at a time corresponding to the midpoint of each data bit period. The input data is loaded directly into a shift register and when all the data bits of that word have been received, then the data is parallel shifted out of the shift register onto a data bus. The data bus passes the data to the rest of the circuit.

Such known asynchronous serial data receivers suffer from the disadvantage that the operation of the receiver must be synchronized with the incoming data by detecting the leading edge of the start bit before the data can be read. This requirement has the effect that specific circuit elements and data/control lines have to be provided to provide this synchronized operation. In addition, the sampling of the input data line so as to locate the leading edge of the start bit must necessarily take place at a rate many times greater than the data rate in order that the phase of the input data can be accurately determined. The maximum sampling rate for identifying the leading edge is limited by the maximum rate at which the circuit can be driven and since the data rate is necessarily a small fraction of the sampling rate then this effect also limits the maximum data rate which can be received.

Viewed from one aspect, the present invention provides an asynchronous serial data receiver for receiving words of serial data, each comprising a plurality of data bits prefixed by at least one start bit, having a shift register with a plurality of stages, characterized in that each data word is sampled into said shift register at a rate at least two times greater than the serial data rate, and a detector coupled to at least one stage of said shift register detects said start bit and triggers the reading of said data bits from stages assessed in relation to said start bit to be storing samples corresponding to points within said data bits.

The present invention provides an asynchronous serial data receiver which does not have to first detect the phase of the input data and then sample that data at points of known phase. The circuit of the present invention need not include circuit elements and control lines for adjusting the times at which samples are taken which makes it less expensive to make and more reliable than the known circuits. In addition, the asynchronous serial data receiver of the present invention does not need to sample the input data at a rate many times greater than the data rate so as to accurately locate the leading edge of the start bit. Accordingly, for circuit elements capable of working at a given maximum speed, the present invention provides an asynchronous serial data receiver capable of receiving data at a higher data rate.

In particularly preferred embodiments of the present invention, the detector is coupled to two adjacent stages of said shift register and triggers the reading of the data bit when both of the stages of the shift register have a value corresponding to the start bit. This feature gives the asynchronous serial data receiver of the present invention an improved immunity to electrical noise since two consecutive samples must have a value indicative of the start bit in order to trigger the reading of the data bits. It is unlikely that electrical noise could affect the value of two consecutive samples.

Another preferred feature of the present invention is that the detector also triggers a delay element which resets the shift register after the data bits have been read. This reduces the number of circuit elements and control lines needed which further increases reliability and decreases cost.

The data bits can be read out of the shift register in a number of different ways, e.g., the stages of the shift register to be read could be sequentially read into the rest of the system.

However, in a particularly preferred embodiment of the present invention, the data bits are read by simultaneously transferring those samples assessed in relation to said start bit to correspond to points within said data bits into a data register, i.e., parallel readout. This feature simplifies the circuitry for reading the data bits from the shift register and allows all the data bits from a data word to be read from the shift register under the control of a single signal from the detector.

In practice, the data register has the same number of stages as there are data bits in each data word. Thus, each stage of the shift register having a value corresponding to a read point within a data bit is directly coupled to a corresponding stage of the data register. When the detector detects the start bit, then this triggers the parallel shifting of the data bits into the data register.

A particularly preferred arrangement of the shift register is that the stage of the shift register furthest from the stage of the shift register into which the data word is sampled is coupled to the detector. This arrangement contributes to minimizing the number of stages in the shift register. The number of stages in the shift register is further reduced if the length of the shift register is chosen so that when the start bit is detected by the detector having been shifted along the shift register, then the last sample clocked into the shift register corresponds to the read point within the last data bit in the data word.

It will be appreciated that providing the stages of the shift register read contain valid data, i.e., contain a sample of a point within the relevant data bit, then the exact rate at which the data is sampled and the exact point within the data bit sampled do not matter. However, in particularly preferred embodiments of the present invention, the sampling rate is an integral odd multiple of the data rate. With such an arrangement, the median sample for a given data bit should be close to the midpoint of that data bit. Sampling as close as possible to the midpoint is advantageous as it increases the resistance of the device to electrical noise and mismatches in the data rate and the sampling rate.

It will be apparent from the proceeding discussion of the invention that an advantage of the present invention is that for a given maximum speed of the circuit elements of the asynchronous serial data receiver the present invention allows higher data transmission rates than the known devices. The maximum data rate which the asynchronous serial data receiver of the present invention can receive is increased as the number of samples per bit period which are clocked into the shift register is decreased. It has been found to be particularly advantageous for three samples per bit to be clocked into the shift register. This arrangement allows the data rate to be high whilst maintaining a sufficient degree of resistance to electrical noise in the form of spikes and jitter and a sufficient resistance to any errors arising from slight mismatches in the data rate and the rate at which the data is sampled.

Viewed from another aspect, the present invention provides a method of receiving words of asynchronous serial data, each comprising a plurality of data bits prefixed by at least one start bit, characterized by sampling said data words into a shift register having a plurality of stages at a rate at least two times greater than the serial data rate, and reading said data bits from stages storing samples corresponding to points within said data bits when a detector coupled to at least one stage of said shift register detects said start bit.

Viewed from a further aspect, the present invention provides a printer controlled by words of asynchronous serial data, each comprising a plurality of data bits prefixed by at least one start bit, having a shift register with a plurality of stages, characterized in that each data word is sampled into said shift register at a rate at least two times greater than the serial data rate, and a detector coupled to at least one stage of said shift register detects said start bit and triggers the reading of said data bits from stages storing samples corresponding to points within said data bits. The present invention is particularly suitable for application to a printer since printers are controlled by asynchronous serial data and a printer capable of reliable high speed reception of this data using inexpensive and simple circuitry is advantageous.

An embodiment of the present invention will now be described, by way of example only, with reference to the accompanying drawings in which:

FIG. 1 is a schematic illustration of a asynchronous serial data receiver in accordance with the present invention.

FIGS. 2a to 2c are a schematic illustration of the operation of the circuit of FIG. 1.

Figure 2B:
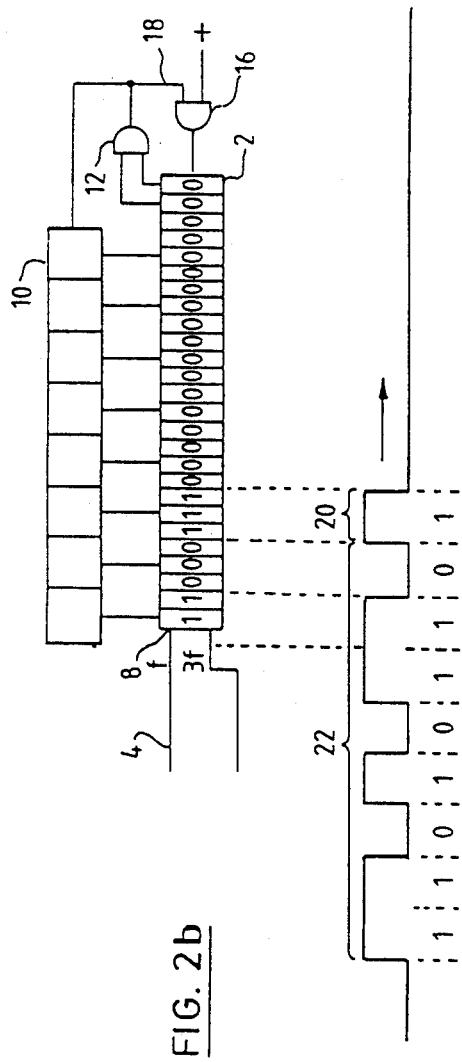

The asynchronous serial data receiver illustrated in FIG. 1 includes a twenty-six stage shift register 2 having an input 8 to which the serial data at a data rate f is fed along data line 4. The shift register 2 is supplied with a clock signal at a clock rate 3f along a clock line 6. Upon receipt of each clock pulse, the shift register 2 shifts all the values stored in each register one stage away from the input 8 and samples the value on the data line 4 into the first stage of the shift register 2 via the input 8. When the start bit has been clocked through to the end of the shift register 2, then valid data is held in every third stage starting with the first stage of the shift register 2. In order to read out the data, an eight stage data register 10 is coupled to the shift register 2. Each stage of of the data register 10 is fed with the signal currently stored in a corresponding stage of the shift register 2. The first stage of the data register 10 is fed with the signal from the first stage of the shift register 2. Every third stage of the shift register 2 supplies its signal to the next stage of the data register 10, respectively. When the data word has been fully loaded into the shift register 2, then the arrangement is such that each stage of the data register is connected to a stage of the shift register 2 having a value sampled close to the midpoint of a data bit.

A start bit AND gate 12 receives the signals from the two stages of the shift register 2 which are furthest from the input 8. The output from the start bit AND gate 12 is fed to the data register 10 along read line 14 and to reset delay AND gate 16 along reset line 18. When the signal on the read line 14 goes high (i.e., when the start bit 20 has reached the two stages of the shift register 2 to which the start bit AND gate 12 is coupled), the data register 10 reads and stores into each of its stages the value held in the corresponding stage of the shift register 2. The signal on the reset line 18 will also go high and this has the effect of causing the output from the reset delay AND gate 16 to go high. The other input to reset delay AND gate 16 is held permanently high. The output from the reset delay AND gate 16 is fed to the shift register 2 where it causes all of the stages of the shift register 2 to be reset to zero. The time delay between the output of the start bit AND gate 12 going high and the output of the the reset delay AND gate 16 going high is sufficient that the reading of the values from the shift register 2 into the data register 10 is complete before the shift register 2 is reset. If required, a delay line may be inserted along the reset line 18 to increase the time between the triggering of the reading of the shift register 2 and the resetting of the shift register 2.

The signals stored in the data register 10 are read into the rest of the circuit using conventional circuit elements and methods which will not be further described.

Figure 2C:
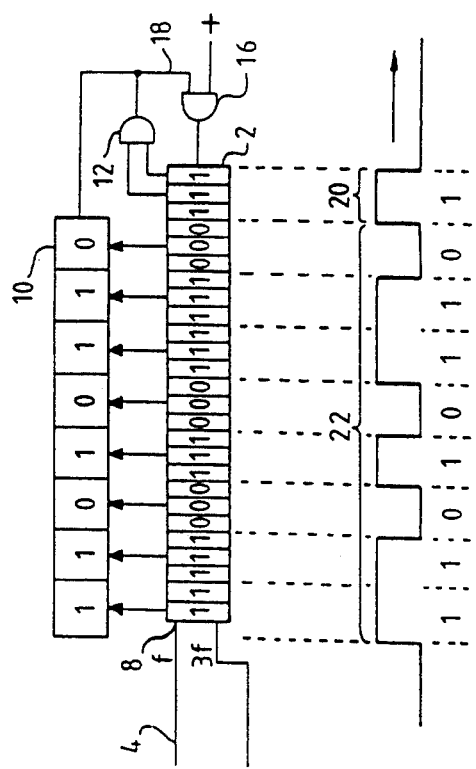

Turning now to FIGS. 2a to 2c, these schematically illustrate the reading of a data word by the asynchronous serial data receiver shown in FIG. 1. The upper portion of each of FIGS. 2a to 2c shows the circuit of FIG. 1 and the signals stored therein. The lower portion of each of FIGS. 2a to 2c illustrates a data word in the form of the signal which is fed to the shift register 2.

FIG. 2a shows that each data word comprises a start bit 20 followed by eight data bits 22. The value of the start bit is high, i.e., binary one. It will, however, be appreciated that the value of the start must be the opposite of the value on the data line 4 when no data is being supplied, i.e., the rest state of the data line. In the present case, the rest state is low, i.e., binary zero and so the start bit must be a one. However, if the rest state is high, then the start bit must be zero.

The eight data bits represent the serial data which the circuit is intended to receive. The circuit could form part of a printer in which case the data bits could represent a character to be printed, the printer being disposed to receive its instructions for printing along a serial data line. The printer is not synchronized with the source of the data word and so the phase of the data word is not known. Alternatively, the circuit could form part of a receiver of serial data from a storage device, such as a disc file.

The shift register 2 samples the value on the data line 4 every time it receives a clock pulse, i.e., at three times the data rate. After the previous data word was received, all the stages of the shift register 2 were reset to zero and since the rest state of the data line 4 is zero, then all the stages of the shift register 2 have a zero value. Consequently, start bit AND gate 12 does not receive two high values at its inputs indicating the start bit 20 has reached the end of the shift register 2. Electrical noise on the data line 4 may cause a single high value to be sampled into the shift register 2, but it is unlikely that two consecutive high values could be caused by electrical noise. Thus, since two consecutive high values must be detected by the start bit AND gate 12, then a false indication of a start bit is unlikely.

Turning now to FIG. 2b, this illustrates the situation when the data word has been partially read into the shift register 2. As shown, three samples corresponding to each bit are sampled into the shift register 2 and are subsequently shifted away from the input 8 and towards the start bit AND gate 12. The high values corresponding to the start bit 20 have not yet reached the start bit AND gate 12, therefore, the circuit continues to sample new values and shift the stored values until the situation illustrated in FIG. 2c is reached.

As shown in FIG. 2c, the first two samples corresponding to the start bit 20 have now reached the start bit AND gate 12. Samples corresponding to all the data bits 22 have been sampled into the stages of the shift register 2. It will be seen that three samples have been taken for each of the data bits 22 other than the last to be sampled. This last data bit 22 has been sampled twice, the final sample being close to the midpoint of the data bit 22. The inputs to the start bit AND gate 12 are both high which causes the output of the start bit AND gate 12 to go high. In the absence of any electrical noise, it will be appreciated that only one stage of the shift register 2 need be monitored to detect the start bit. However, as explained above, monitoring two adjacent stages to detect the start bit gives an improved immunity to noise.

The high signal on read line 14 triggers the values stored in each of those stages of the shift register 2 which are coupled to stages of the data register 10 to be read and stored into the corresponding stages of the data register 10, i.e., the data bits 22 are parallel shifted into the data register 10. It is significant to note that those stages of the shift register 2 which are read do at this point contain samples within the data bits 22 close to the midpoints of the data bits 22. It is possible that electrical noise can affect the position of the leading edge of the start bit 20 causing it to be sensed either too early or too late. Providing the electrical noise does not introduce an error in the time of sensing of the start bit 20 which shifts the data bits 22 more than one stage in the shift register 2, then the values read and stored onto the data register 10 will still be correct. Similarly, if the leading or trailing edges of the data bits 22 are affected by electrical noise, this will not affect the data read out of shift register 2 which corresponds to points close to the midpoints of the data bits 22.

The high signal produced by the start bit AND gate 12 is also passed to the reset delay AND gate 16 via reset delay line 18. The other input to the reset delay AND gate 16 is permanently high so the output of the reset delay AND gate 16 then also goes high. The output of the reset delay AND gate 16 is fed to the shift register 2 where it triggers all the stages of the shift register 2 to be reset to zero. The delay introduced by the reset delay AND gate 16 is sufficient to allow the data bits 22 to be parallel shifted into the data register 10 before the shift register 2 is reset.

The data bits in the data register 10 are then passed to the rest of the device in a conventional manner which need not be further described. The circuit has now returned to the state illustrated in FIG. 2a and is ready to receive the next data word.

The overall operation of the receiver is that a start bit 20 followed by eight data bits 22 at a data rate f is clocked, or sampled, at a rate of 3f into a twenty six bit shift register 2. When the sampled start bit arrives at the end of the shift register 2, the first two sampled values are detected. When detected, the central values corresponding to each of the data bits are transferred in parallel to an eight bit data register 10 and the shift register 2 is reset.

While the present invention has been described with reference to preferred embodiments thereof, it will be appreciated that those skilled in the art will, upon learning of the invention, visualize yet other embodiments that are within the spirit and scope of the invention. Thus, the invention is to be limited only by the claims hereof.

What is claimed is:

1. An asynchronous data receiver connected to receive a serial transmission comprised of a start bit followed directly by the data bits of a word of serially transmitted date, said transmission occurring at a particular bit rate, comprising:
  a shift register connected to receive said start bit and said word of serially transmitted data, said register having an odd number of stages for containing said start bit and each said data bit, said odd number greater than one so that there is a middle stage containing each said data bit;
  storage means having a plurality of stages, each stage of said storage means connected to one of said middle stages of said shift register, for receiving said word from said shift register;
  a local clock having a frequency at an integral odd multiple of said bit rate at which said serially transmitted data is transmitted, said odd multiple equal to said odd number of stages for each said data bit, said clock connected to said shift register for propagating said serially transmitted data from stage to stage; and
  detector means coupled to at least two adjacent stages of said shift register for sensing said start bit and for producing a detector signal coupled to said storage means to enable the transfer of said data bits from each of said middle stages to said storage means.

2. The receiver of claim 1 further including:
  reset means connected to said detector means and to said shift register for receiving said detector signal and for resetting said shift register after said data bits have been transferred to said storage means.

3. The receiver of claim 2 wherein
  said shift register contains exactly the number of stages equal to three times the total of the sum of data bits in said word plus said start bit and wherein said transmission is received at a first stage of said shift register and propagated through said shift register until said start bit is received in a final stage of said shift register,
  said detector means is comprised of a first AND gate, one input of which is connected to said final stage of said shift register and another input of which is connected to the next-to-last stage of said shift register, a single output signal from said first AND gate connected to said storage means to enable the transfer of said bits to said storage means upon detection of said start bit in said final stage and said next-to-last stage of said shift register, and wherein said reset means is comprised of a second AND gate, one input of which is connected to said single output signal from said first AND gate, a second input of which is held high to establish an output signal from said reset means whenever said start bit is detected in said last stage and said next-to-last stage of said shift register.

4. The receiver of claim 1 wherein said odd number of stages in said shift register containing each said data bit is three and wherein said local clock frequency is set at an integral odd multiple of said bit rate at three.

5. The receiver of claim 4 further including:

reset means connected to said detector means for receiving said detector signal and for resetting said shift register after said data bits have been transferred to said storage means.

* * * * *